(12) United States Patent
Foreman

(10) Patent No.: US 11,721,870 B2
(45) Date of Patent: Aug. 8, 2023

(54) BATTERY CADDY HAVING MAGNETIC RETAINING FEATURE

(71) Applicant: Tools Aviation, LLC, Oswego, IL (US)

(72) Inventor: Richard Foreman, Wayne, IL (US)

(73) Assignee: Tools Aviation, LLC, Oswego, IL (US)

( * ) Notice: Subject to any disclaimer, the term of this patent is extended or adjusted under 35 U.S.C. 154(b) by 0 days.

(21) Appl. No.: 17/508,979

(22) Filed: Oct. 23, 2021

(65) Prior Publication Data

US 2022/0149472 A1 May 12, 2022

Related U.S. Application Data

(60) Provisional application No. 63/104,720, filed on Oct. 23, 2020.

(51) Int. Cl.
| | |
|---|---|
| *H01M 50/264* | (2021.01) |
| *H02J 7/02* | (2016.01) |
| *H02J 7/00* | (2006.01) |
| *H01M 10/46* | (2006.01) |
| *B65D 71/50* | (2006.01) |
| *H01M 50/267* | (2021.01) |
| *H01M 50/213* | (2021.01) |
| *H02J 50/10* | (2016.01) |

(52) U.S. Cl.
CPC .......... *H01M 50/264* (2021.01); *B65D 71/50* (2013.01); *H01M 10/46* (2013.01); *H01M 50/213* (2021.01); *H01M 50/267* (2021.01); *H02J 7/0045* (2013.01); *H02J 7/02* (2013.01); *H02J 50/10* (2016.02)

(58) Field of Classification Search
CPC .... H02J 7/0003; H02J 7/00047; H02J 7/0045; H02J 7/02; H02J 50/10; H01M 50/264; H01M 10/46; H01M 50/213; H01M 50/267; B65D 71/50
USPC .................................................. 320/110, 108
See application file for complete search history.

(56) References Cited

U.S. PATENT DOCUMENTS

| | | | | |
|---|---|---|---|---|
| 2,476,722 A | * | 7/1949 | Gelardin | B05C 13/00 211/DIG. 1 |
| 3,648,449 A | * | 3/1972 | Greive | D01H 1/427 57/354 |
| 5,303,214 A | * | 4/1994 | Kulakowski | G11B 17/225 |
| 5,686,811 A | * | 11/1997 | Bushong | H02J 7/0045 429/96 |

(Continued)

FOREIGN PATENT DOCUMENTS

| | | |
|---|---|---|
| CN | 207184166 | 4/2018 |
| CN | 210245587 | 4/2020 |

(Continued)

OTHER PUBLICATIONS

PCT Search Report dated Jan. 28, 2022.

*Primary Examiner* — M Baye Diao
(74) *Attorney, Agent, or Firm* — Erickson Law Group, PC

(57) ABSTRACT

A battery holding and dispensing device can hold a plurality of batteries, in a single battery size or an assortment of battery sizes. The battery holding and dispensing device includes a frame having a plurality of compartments sized and shaped to each receive a battery of a particular battery size and each having a magnetic insert for releasably retaining the battery in the compartment. A system is disclosed for inductive charging of batteries held in a caddy.

21 Claims, 11 Drawing Sheets

(56) References Cited

U.S. PATENT DOCUMENTS

| | | | | |
|---|---|---|---|---|
| 6,340,350 B1 * | 1/2002 | Simms | ................ | A61B 5/0002 |
| | | | | D3/203.1 |
| 6,857,755 B1 * | 2/2005 | Lewis | ................ | A44C 15/0015 |
| | | | | 362/249.06 |
| 7,159,491 B1 * | 1/2007 | Chaconas | ............... | B25B 13/06 |
| | | | | 81/177.85 |
| 7,287,648 B2 * | 10/2007 | Foreman | ........... | H01M 10/4207 |
| | | | | 206/703 |
| 7,859,220 B2 * | 12/2010 | Bushong | ........... | H02J 7/007192 |
| | | | | 429/100 |
| 9,022,218 B2 * | 5/2015 | Foreman | ................ | B65D 83/02 |
| | | | | 206/703 |
| 9,159,967 B1 * | 10/2015 | Hanson | ............... | H01M 50/267 |
| 11,134,813 B2 * | 10/2021 | Ma | ......................... | A47K 10/48 |
| 2013/0095439 A1 * | 4/2013 | Putrello, Jr. | ............... | F23Q 7/02 |
| | | | | 431/258 |

FOREIGN PATENT DOCUMENTS

| | | | | |
|---|---|---|---|---|
| CN | 107732069 B | * | 2/2021 | .......... H01M 2/1077 |
| DE | 60009088 T2 | * | 10/2004 | ......... B65D 83/0409 |
| EP | 1596461 A1 | * | 11/2005 | ............ H01M 10/46 |
| JP | 5915886 B2 | * | 5/2016 | ................ G06K 7/08 |
| RU | 2662224 C1 | * | 7/2018 | ............ H02J 7/0045 |

* cited by examiner

BATTERY CADDY HAVING MAGNETIC RETAINING FEATURE

This application claims the benefit of Provisional Application U.S. Ser. No. 63/104,720, filed Oct. 23, 2020.

BACKGROUND

In the field of aviation, an airplane pilot is required to use many battery-powered devices, which devices serve either a primary or backup function. It is imperative that a pilot have ready access to a fresh supply of batteries in the event that batteries become inoperative or spent during flight. Some of these battery-powered devices include: handheld global positioning systems (GPS), handheld emergency radio transceivers, handheld calculators, "EGB"'s, flashlights, and intercom systems for additional communication headsets.

Different battery-powered devices use different size batteries. Batteries are available in standard sizes and voltages, such as sizes: AAA, AA, C, D, 9V, CR123 and 18650. It has been known for pilots to carry an assortment of batteries loosely in a pilot's flight bag, a hand carried case used by pilots to carry personal items or small items needed in the performance of piloting an airplane. However, when a battery is required it must be located within the flight bag by the pilot during flight. During an emergency, if cabin lighting is lost or the pilot is preoccupied with controlling the aircraft, finding batteries loosely stored in a flight bag can be troublesome and time-consuming.

In addition to the aviation field, other fields have a need for a convenient way to store and then dispense a battery. Photographers have need for batteries, particularly AA sized batteries. Having a battery caddy allows photographers to store a supply of batteries in a neat an organized fashion in their camera bag.

U.S. Pat. No. 9,022,218; discloses a battery holding and storage device, wherein in one embodiment, the batteries are held by detent elements adjacent to, and protruding into, open ends of compartments of the caddy. While this is an exemplary way to releasably retain batteries in the caddy, the present inventor has recognized that repeated inserting and removing of a battery past a detent can wear or cause markings on the battery cover or wrapper that surrounds the battery.

The present inventor has recognized that there is a need for a battery holding and dispensing device that is compact, easy to locate in a dark environment, is conveniently sized to be carried in a personal bag, such as in a pilot's flight bag or in a photographers camera bag, is easy to manipulate to dispense a desired battery even when in a dark environment, and can hold an assortment of batteries. The present inventor has recognized that there is a need for a retention device for releasably holding batteries within compartments of a battery caddy that minimized wear and tear on a battery wrapper caused by repeatedly inserting and removing a battery over time.

SUMMARY

An exemplary embodiment of the invention provides a battery containing and dispensing apparatus or "battery caddy" that includes plural compartments for holding and releasably retaining plural batteries. Each compartment includes a top opening for the ejection of a battery from a compartment. Each compartment includes an upstanding sidewall or sidewalls for laterally retaining the battery. The compartments are at least partially closed by a bottom wall.

A magnetic insert is fit, attached or otherwise associated with each compartment, exposed within each compartment. When a battery is fit fully into a compartment, a portion of the battery, such as a bottom terminal, is magnetically engaged to the magnetic insert, and the battery is releasably held thereby, to be retained in the compartment.

The magnetic inserts can be attached to the bottom wall associated with each compartment. The bottom wall can be molded with the rest of the caddy or can be a separate piece that is attached to the rest of the caddy.

The compartments of the battery caddy can be arranged to contain standard batteries being oriented side-by-side in parallel.

The battery caddy can be composed of a luminescent plastic.

The compartments can each include at least one opening through a sidewall thereof. The compartments can each include an upper opening and a lower opening. The lower opening can be open to a bottom opening adjacent to a bottom wall of the compartment such that a user can push a bottom surface of a battery held therein upward to eject the battery, wherein the user's finger will pass vertically though the lower opening. The compartment sidewalls can be of a compatible shape as the battery held therein to closely conform to the battery chape, wherein a user can ascertain a battery size in the compartment by touching an outside of the compartment. A user can also touch a battery held within the compartment either through the bottom opening or the top opening through the sidewalls.

The caddy can be elongated and sized to be held in a user's hand.

The battery caddy can have compartments that are of varying sizes to accommodate a collection of batteries of various battery sizes.

The battery compartments can each comprise an external rounded sidewall having a contour substantially parallel to an outside contour of the battery held therein.

A further enhancement of the embodiments of the provides: a frame including a plurality of compartments, each compartment sized and configured to hold a battery substantially within the compartment, and having an open end for dispensing the battery out of the compartment. Each compartment comprises a positive contact that touches a positive terminal of a battery held in the compartment and a negative contact that touches a negative terminal of the battery held within the compartment. An inductive charging coil can be mounted to or embedded into the frame. Electronics can be embedded in or mounted to the frame and in electrical communication with the coil. The electronics condition the electric current developed by the coil, the electronics having an output in electrical communication with the positive and negative contacts of the compartments. The caddy can be placed on an inductive charging plate to charge all of the batteries in the caddy via the inductive charging coil. This enhancement can be used with the magnetic inserts which hold batteries within the caddy, or can be used with a mechanical or other means of holding batteries within the caddy.

Numerous other advantages and features of the present invention will be become readily apparent from the following detailed description of the invention and the embodiments thereof, and from the accompanying drawings.

DETAILED DESCRIPTION

Figure 1:
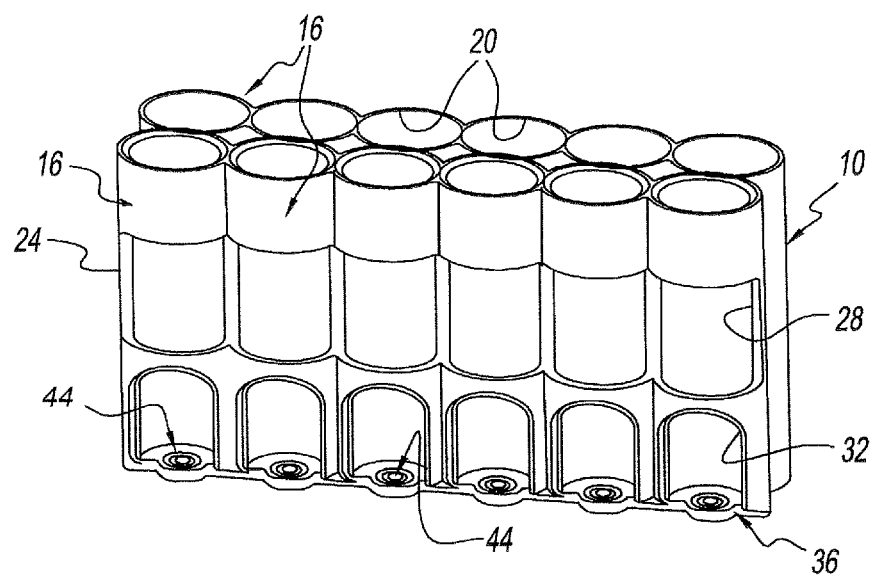
FIG. 1 is a top perspective view of an exemplary embodiment battery caddy according to the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Pat. No. 9,022,218, issued May 5, 2015. The caddies described herein are similar to the caddies described in the aforementioned patent except for modifications as described herein. This application also incorporates by reference Provisional Application U.S. Ser. No. 63/104,720, filed Oct. 23, 2020.

The caddies and retainer described herein can be plastic, made by injection molding. The plastic can be polypropylene or polycarbonate. The plastic can be a phosphorescent resin such as a Resin Series 100(PP) polypropylene or Series 300(PC) polycarbonate available from RTP Company of Winona, Minn., US.

Multiple embodiments are described herein. Like elements between embodiments are given the same reference number.

The embodiments of the invention are shown and described holding AA sized batteries. However, the invention encompasses any size battery known now or in the future.

Figure 2:
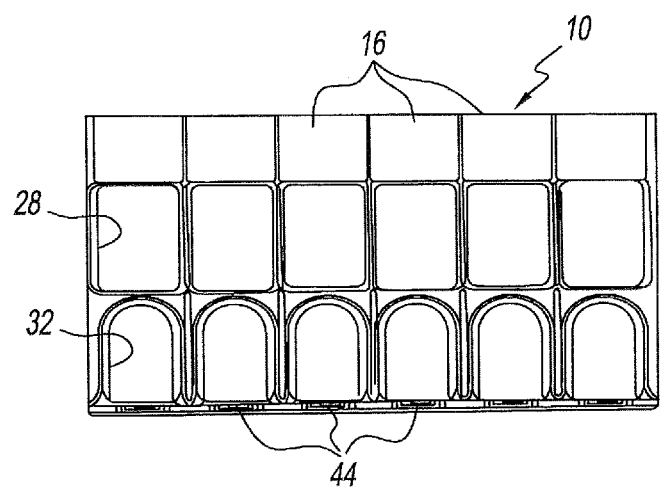
FIG. 2 is an elevation view of the caddy of FIG. 1.

FIGS. 1-2 illustrate a battery caddy 10 that includes (12) compartments 16 for holding (12) batteries, particularly standard size AA batteries. Each compartment 16 includes a top opening 20 for the ejection of a battery from a compartment. Each compartment includes a cylindrical upstanding sidewall 24 with an upper side opening 28 and a lower side opening 32. The compartments are partially closed by a bottom wall 36 that is shaped to allow a front, bottom edge of a battery held therein to be exposed for the purpose of a user displacing a battery at least partially out of the top opening 20 by pushing the battery edge upward toward the top opening 20.

According to the exemplary embodiment, a magnetic insert 44 is fit into the bottom wall 36. The insert can be exposed inside the respective compartment 16 or embedded into the bottom wall 36. When a battery "B" is fit fully into a compartment (as shown in FIG. 3), a bottom portion of the battery, such as a terminal "T", is magnetically engaged to the magnetic insert, and releasably held thereby to be retained in the compartment 16.

Figure 3:
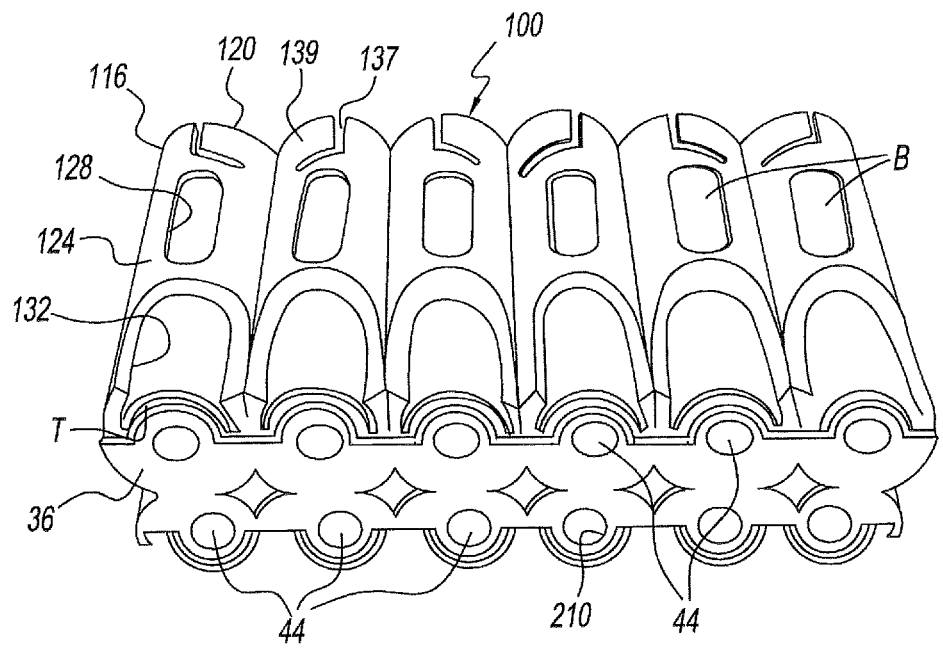
FIG. 3 is a bottom perspective view of an alternate embodiment battery caddy according to the invention.
Figure 4:
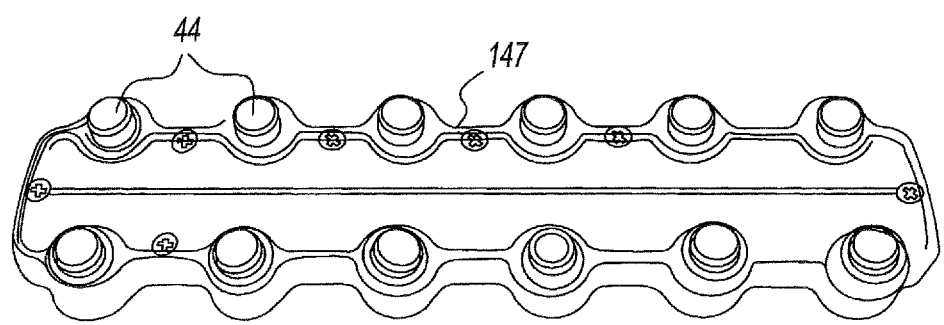
FIG. 4 is a plan view of a bottom wall of the battery caddy of FIG. 3.

FIGS. 3 and 4 illustrate an alternate battery caddy 100 that includes (12) compartments 116 for holding (12) batteries, particularly standard size AA batteries. Each compartment 116 includes a top opening 120 for the ejection of a battery from a compartment. Each compartment includes a cylindrical upstanding sidewall 124 with an upper side opening 128 and a lower side opening 132. The compartments are partially closed by the bottom wall 36 that is shaped to allow a front, bottom edge of a battery held therein to be exposed for the purpose of a user displacing a battery at least partially out of the top opening 120 by pushing the battery edge upward toward the top opening 120.

The magnetic inserts 44 can be fit and fixed into corresponding openings 210 through the bottom wall 36. The magnetic inserts 44 can be exposed inside the respective compartment 116 or embedded into the bottom wall 36. When a battery "B" is fit fully into a compartment (as shown in FIG. 3), a bottom portion of the battery, such as a bottom terminal "T", is magnetically engaged to the magnetic insert 44, and releasably held thereby to be retained in the compartment 116.

In this embodiment, near to the top opening 120 of each compartment, each sidewall 124 includes an L-shaped slot 137, open at the top opening 120, that forms a flexible arm 139. An upper battery retaining detent 110 formed with the flexible arm 139, shown in FIG. 12 and as described in U.S. Pat. No. 9,022,218, herein incorporated by reference, can be used as an additional battery retention device. The detent comprises a tapered tip that extends into a top open end of a compartment to releasably hold a battery within the compartment. Force by a user on a bottom edge of a battery from below, is sufficient to deflect the flexible arm 139 and displace the detent 110 to allow the battery to pass by the detent and be ejected. The detents may optionally be eliminated as per the first embodiment.

FIG. 4 illustrates a further bottom wall 147. Instead of the magnetic inserts 44 being fit and fixed into the bottom wall 36, the magnetic inserts 44 can be fit and fixed into the further bottom wall 147. The magnetic inserts 44 can be fit into the further bottom wall 147 by adhesive, molding, friction fit or other method. In this embodiment the further bottom wall 147 can be formed separately and then attached to bottom surfaces of one or more or all of the compartments, such as attached to an underside of the bottom wall 36. Alternately, the further bottom wall 147 replaces the bottom wall 36 and is secured to bottom ends of the sidewalls 124 of the compartments 116.

The magnetic inserts 44 are fixed into the further bottom wall 147 and then the further bottom wall 147 is attached in some manner to the bottom surfaces of one or more or all of the compartments, such as to the bottom wall 36, such as by being physically attached, glued or simply held by the magnetic attraction of the magnetic inserts 44 to the batteries in the caddy. When the further bottom wall 147 is attached, the magnetic inserts 44 fit into the corresponding openings 210 through the bottom wall 36.

Figure 5:
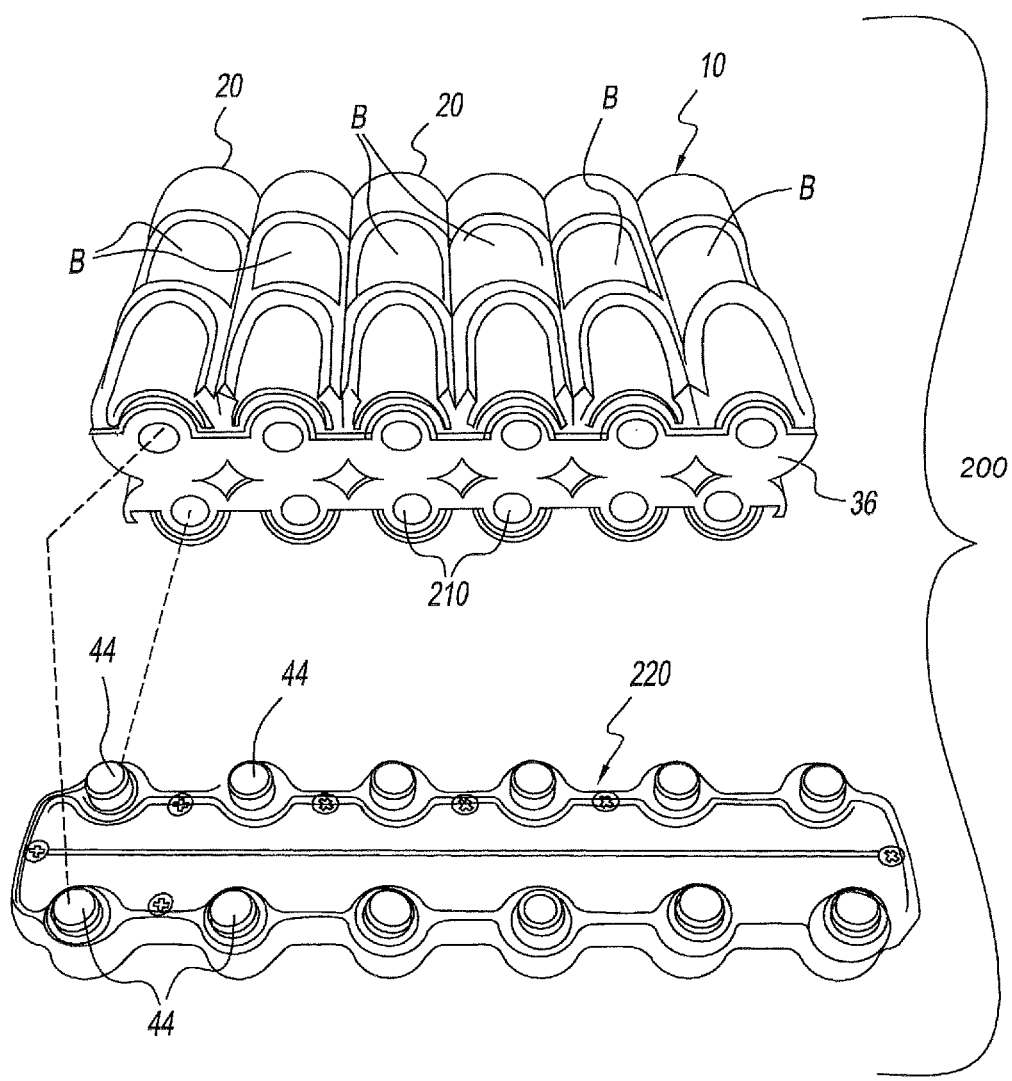
FIG. 5 is an exploded perspective view of a further alternate embodiment battery caddy assembly.
Figure 6:
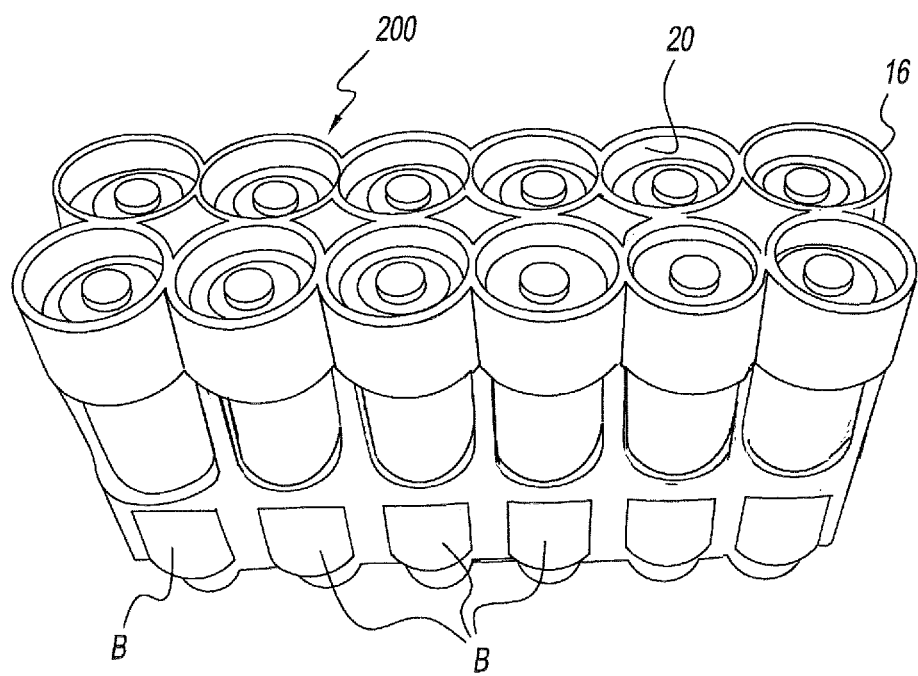
FIG. 6 is a perspective view of either battery caddy of FIG. 5.

FIGS. 5 and 6 illustrate another embodiment battery caddy assembly 200 of the invention. In this embodiment, the caddy 10 as shown in FIG. 1 and a separate caddy retainer 220 are formed as separate pieces. The caddy 10 can be a molded battery caddy having bottom openings 210 in the bottom wall 36 but without magnetic inserts fit into the bottom openings 210. A separate retainer 220 has a layout similar to the layout of the bottom wall 36 of the caddy 10, and has protruding magnetic inserts 44 that register with, and extend into, each of the openings 210 when the retainer 220 is placed over and onto the bottom wall 36. The retainer is held in place by magnetic attraction between the batteries "B", particularly the terminals "T" of the batteries, held in the caddy 10 and the magnetic inserts 44 protruding into the openings 210 of the bottom wall 36. Alternately, the retainer 220 can be adhesively secured or otherwise secured to the underside of the bottom wall 36 or to undersides of the sidewalls 24 and the bottom wall 36 eliminated.

The magnetic inserts 44 (and 306 described below) can be of sufficient strength to hold batteries in place. Advantageously the magnetic inserts are composed of Neodymium permanent magnet material. The shape of the magnetic inserts is shown as disc-shaped but could be in the form of cylinders, spheres, strips, rectangular block shaped, or other shape. The magnetic inserts could be insert-molded in place in the bottom wall 36 or retainer 220 or post molding inserted into the bottom wall 36 or the retainer 220 of the assembly 200. The magnetic inserts could be insert-molded or post-molding-inserted into the further bottom wall 147 and then attached to the caddy. Magnet material of the magnetic inserts could be made of metal, resin or metal mixed with resin and injection or compression molded. The entire caddy could be injection or compression molded either completely or partially. The separate bottom wall 147 or the retainer 220 could be injection or compression molded of resin or resin mixed with magnetic material.

As an alternate to permanent magnet material, the magnetic inserts could be electromagnets powered by the batteries or an external source.

By using a magnetic retention, a mechanical retention or interference retention, which after repeated insertions and removals may mark or wear the battery wrapper, is avoided. With magnets retaining the batteries, additional battery retention such as by detents shown in FIG. 3 is optional.

Although the specification and drawings disclose embodiments wherein the magnetic inserts are located on a bottom of the caddy, it is encompassed by the invention that the magnetic inserts are located on the side or near the top of each compartment of the battery caddy.

FIG. 7-11 illustrate an alternate caddy 300. This caddy 300 includes two rows 302, 304 of compartments 310, 312. The caddy can be substantially identical to the caddy 100 except magnetic inserts 306 are not included in the bottom wall or a retainer but are instead attached to sidewalls of the compartments 310, 312, between each pair of opposing compartments 310, 312. Batteries B are held within the opposing rows 302, 304 by magnetic attraction to the magnetic inserts 306.

A bottom wall 335 is substantially the same as the bottom wall 36 of the caddy 100, as shown in FIG. 3 but shown for a caddy with eight compartments.

The caddy is assembled by the two rows 302, 304 being separate bodies 302a, 304a. Each body includes a row of sockets 330, one for each compartment 310, 312; the sockets 330 being sized and shaped to receive a magnetic insert 306 and closely conform to a perimeter of the magnetic insert 306. Each socket 330 has a height about half the height of the magnetic insert such that when assembled, each magnetic insert 306 is substantially or completely enclosed within a pair of opposing sockets 330. When the two bodies 302a, 304a, are mated together, the sockets 330 of the row 302 align and register with the sockets 330 of the opposite row 304.

To assist in alignment and assembly, the bodies 302a, 304a have inter-engaging tongues or tabs 336 and vertically elongated grooves or slots 340 formed by a vertically elongated socket 341. Each body 302a, 304a includes three vertically aligned tongues 336 and one vertically elongated groove 340 formed in the vertically elongated socket 341 horizontally spaced from the tongues 336. The three vertically aligned tongues 336 of one body 302a, 304a fit into a respective groove 340 of the respective other body 302a, 304a when the bodies 302a, 304a are fit together. The tongues and grooves can be mechanically held together by a snap-fit or can be adhesively fixed together, or the tongues and grooves can merely be an alignment device and remaining portions of the bodies 302a, 304a can be fixed together. Adhesive can be applied to all or some of the mating surfaces between the bodies 302a, 304a. Other means of attaching the bodies 302a, 304a can be applied, such as plastic welding or mechanical snap fitting. When the two bodies 302a, 304a are fixed together, the magnetic inserts 306 are effectively embedded into the caddy 300.

The magnetic inserts 306 are shown are rectangular block shaped, but other shapes, such as a cylindrical shape are also possible and are encompassed by the invention.

Figure 9:
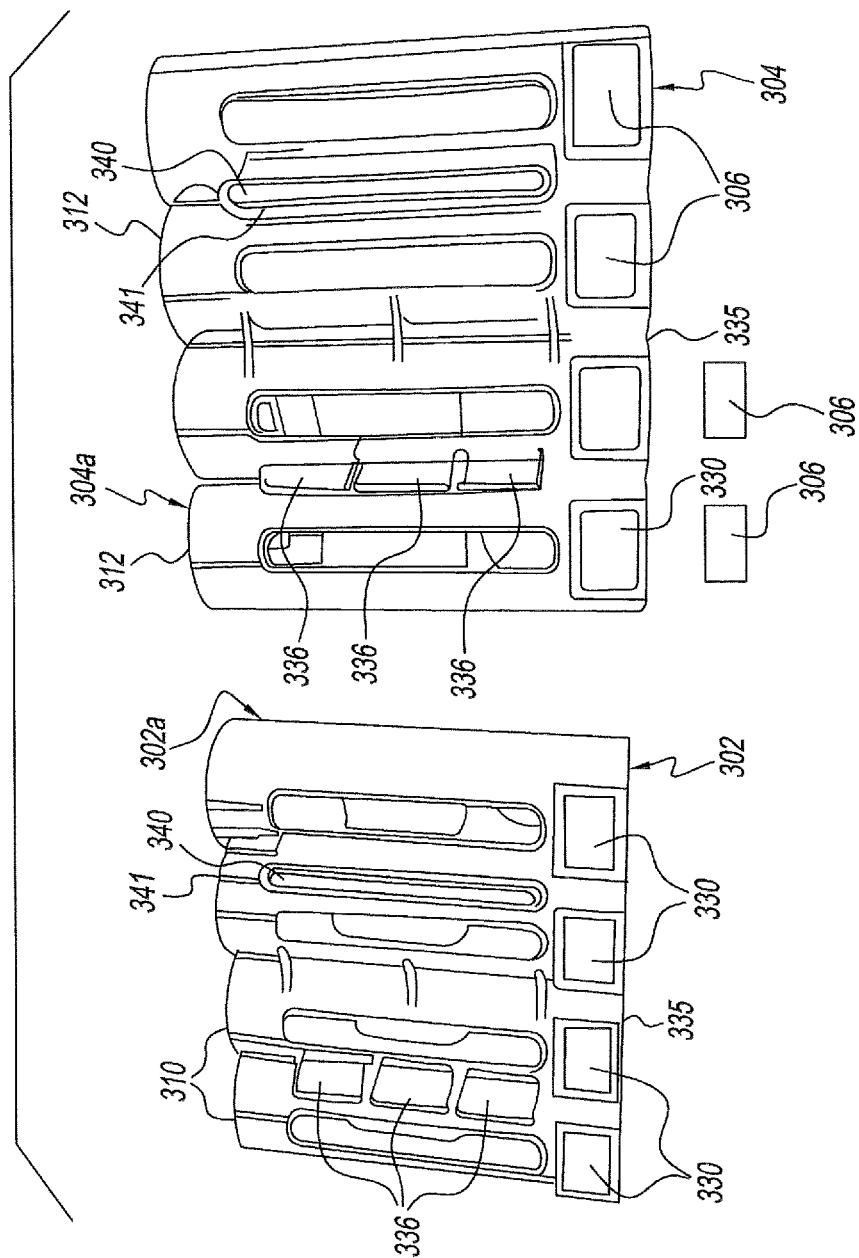
FIG. 9 is an exploded perspective view of the battery caddy of FIG. 7 shown partially assembled.
Figure 10:
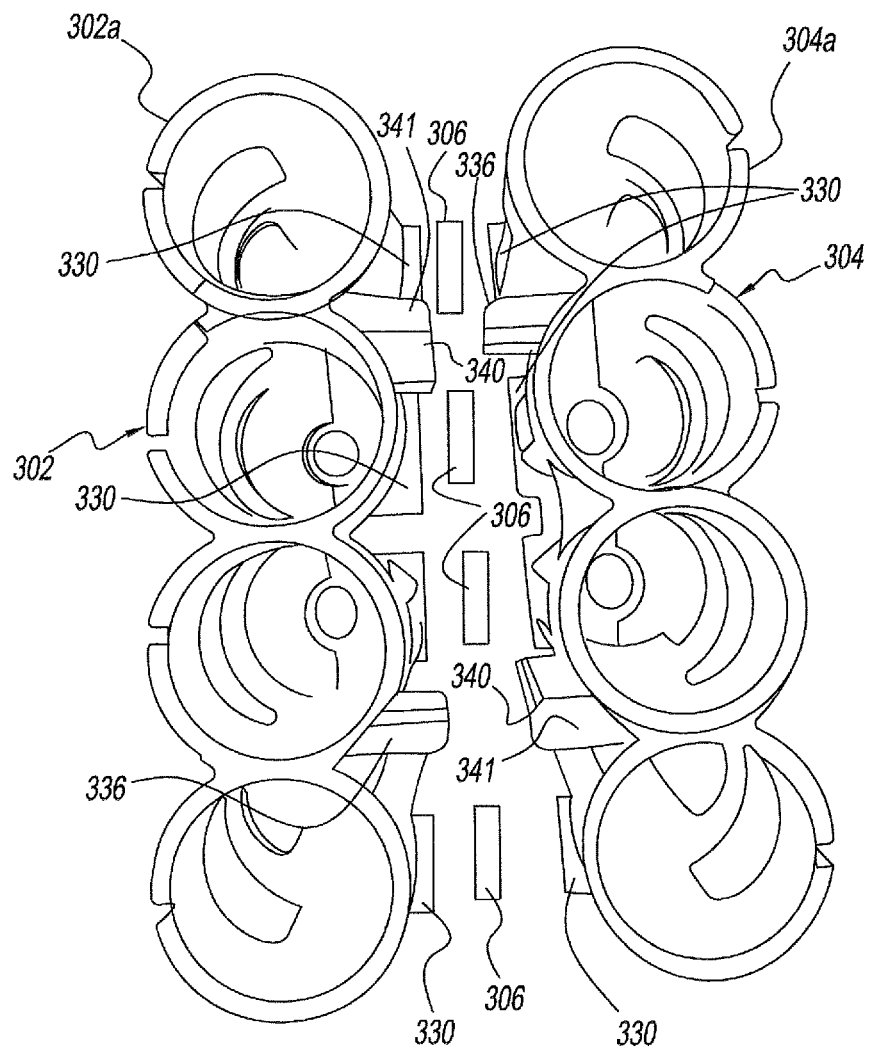
FIG. 10 is a top view of the battery caddy of FIG. 7 shown partially assembled.
Figure 11:
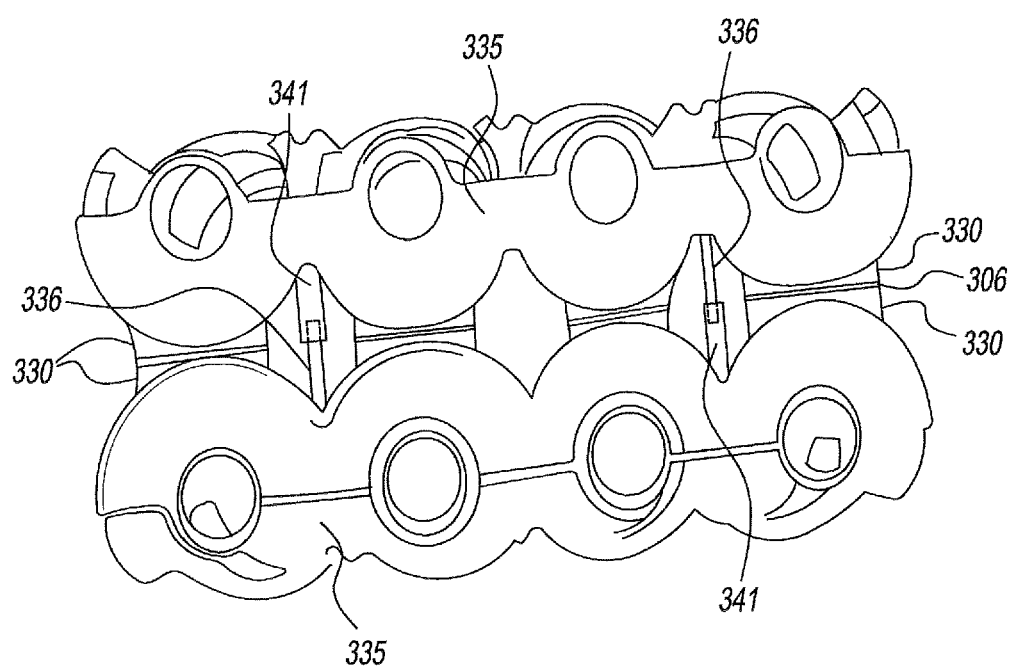
FIG. 11 a bottom view of the battery caddy of FIG. 7 shown assembled.

Although two rows 302, 304 are illustrated fixed together to substantially embed the magnetic inserts, it is also encompassed by the invention to secure the magnetic inserts to only one of the bodies 302a, 304a and not connect two bodies 302a, 304a together, to provide a single row caddy, such as the body 304a shown in FIG. 9. The magnetic inserts 306 can be secured by adhesive, molding or other method. For purposes of description, only two magnetic inserts 306 are shown installed with the understanding that a magnetic insert can be installed between each pair of opposing sockets 330.

Although the caddy 300 is illustrated having the embedded magnetic insert 306 near to the bottom wall, the magnetic inserts could alternately be located at any point between the bottom wall and the top opening of each compartment 310, 312.

Figure 7:
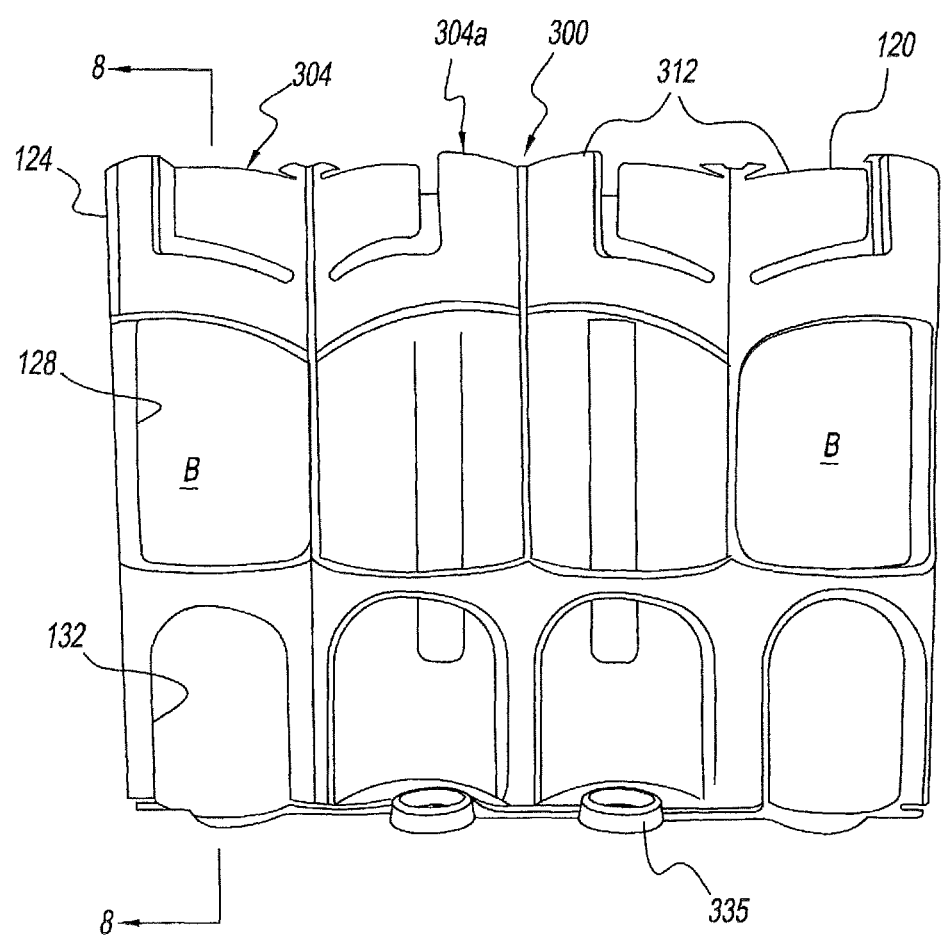
FIG. 7 is a perspective view of a further alternate battery caddy.
Figure 8:
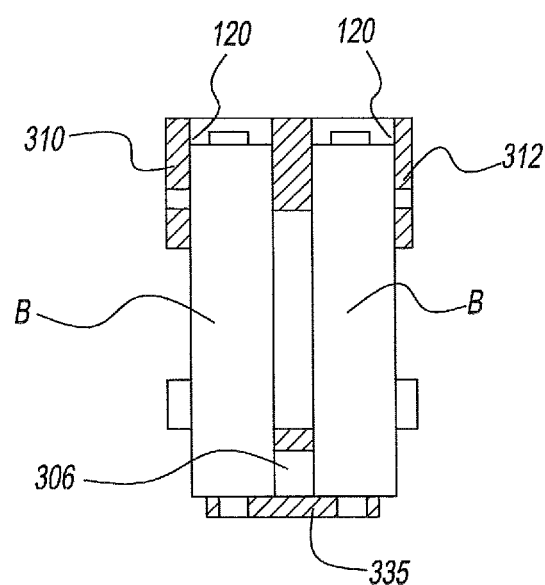
FIG. 8 is a sectional view taken generally through plane 8-8 of FIG. 7.

The tops of the compartments can have plain cylindrical openings as shown in FIGS. 1, 2, 5 and 6 or can have L-shaped slots shown in FIGS. 3 and 7. The L-shaped slots form flexible arms in the compartment sidewall to add some flexibility at the top of the caddy. Detents extending inward from the flexible arms, such as disclosed in U.S. Pat. No. 9,022,218 can be added to enhance in the securement of the batteries. The L-shaped slots and detents are optional and not required to practice the invention.

Figure 12:
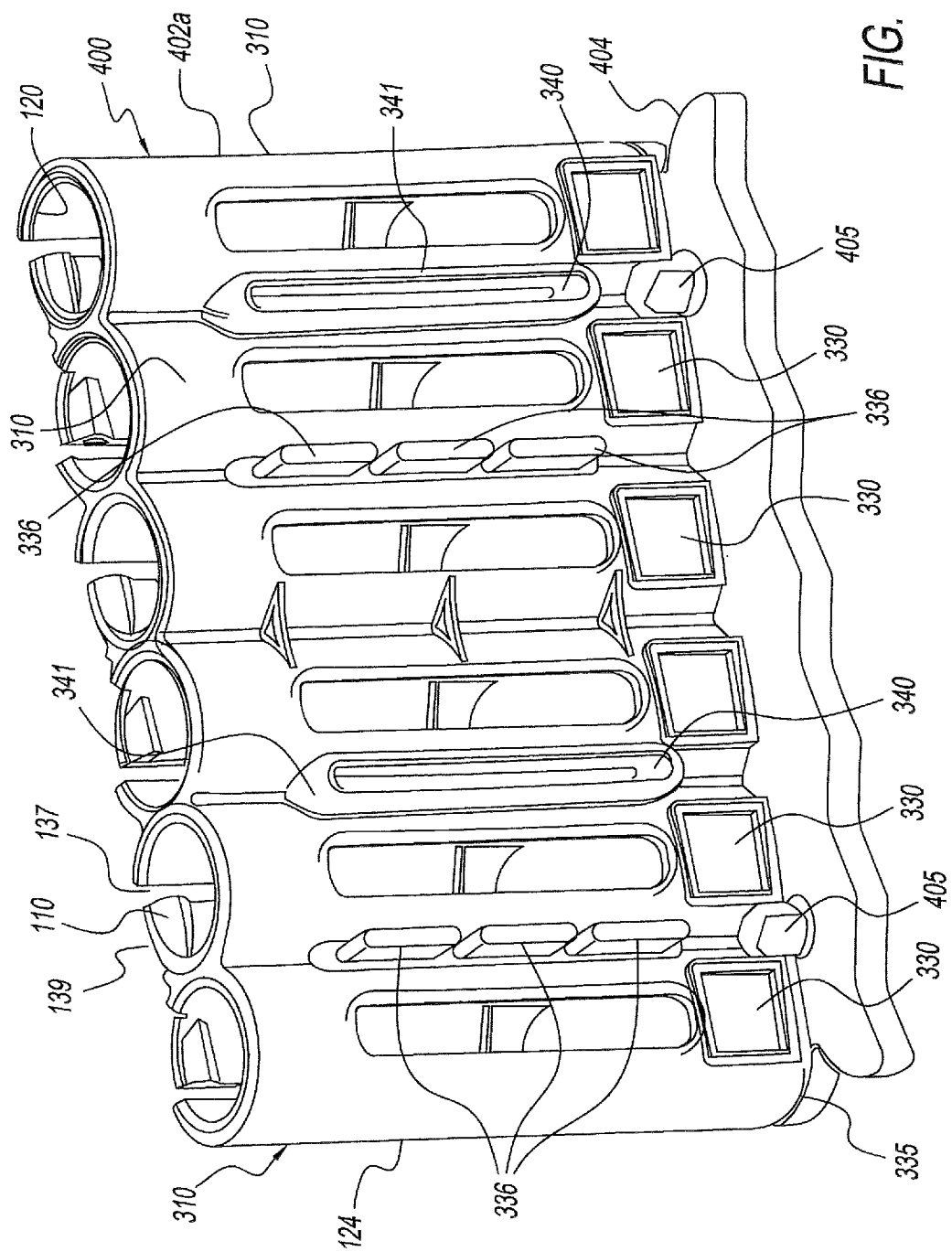
FIG. 12 is a fragmentary perspective view of a further alternate embodiment battery caddy.

FIG. 12 illustrates a further embodiment battery caddy 400 having one caddy body 402a that has six compartments. The caddy body is substantially identical to the caddy body 302a of the previous embodiment except for having six compartments for each caddy body: the caddy body 402a shown and an identical caddy body (not shown) that can be attached to the caddy body 402a in the same fashion as the previous embodiment making a twelve-battery caddy. Magnetic inserts (not shown) would be fit into each socket 330. The caddy body 402a has a bottom wall 435. A further bottom wall 404 is attached under the bottom wall 435. The further bottom wall 404 adds bottom thickness to reduce the magnetic force of the magnetic inserts at the bottom of the caddy and prevents the magnetic inserts from attaching metal debris to the caddy. The further bottom wall 404 includes tabs 405 that fit between compartments 310 to align the further bottom wall 404 with the caddy body 402a, and if a second identical caddy body (not shown) is mated to the caddy body 402a, the tabs align the coupling of the two caddy bodies together as well by closely fitting between four adjacent compartments, two on the caddy body 402a and two opposite compartments on the attached caddy body. The further bottom wall 404 can be adhesively secured to the bottom wall 435, or secured by a snap fit or other method of attachment.

FIG. 12 also illustrates the detents 110 extending inwardly from each flexible arm 139 over an upper edge of a battery held in the compartment. The detents are optional as the magnetic attraction between the magnetic inserts and the batteries B should be sufficient to releasably hold the batteries within the respective compartments, but removable by upward finger force of a user at the bottom of the batteries.

Figure 13:
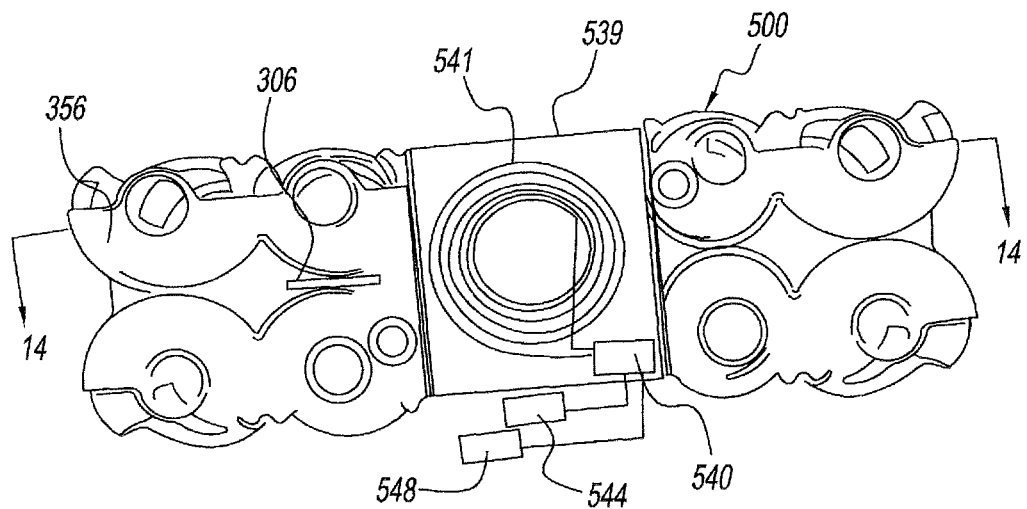
FIG. 13 is a schematic bottom view of a further alternate embodiment battery caddy.
Figure 14:
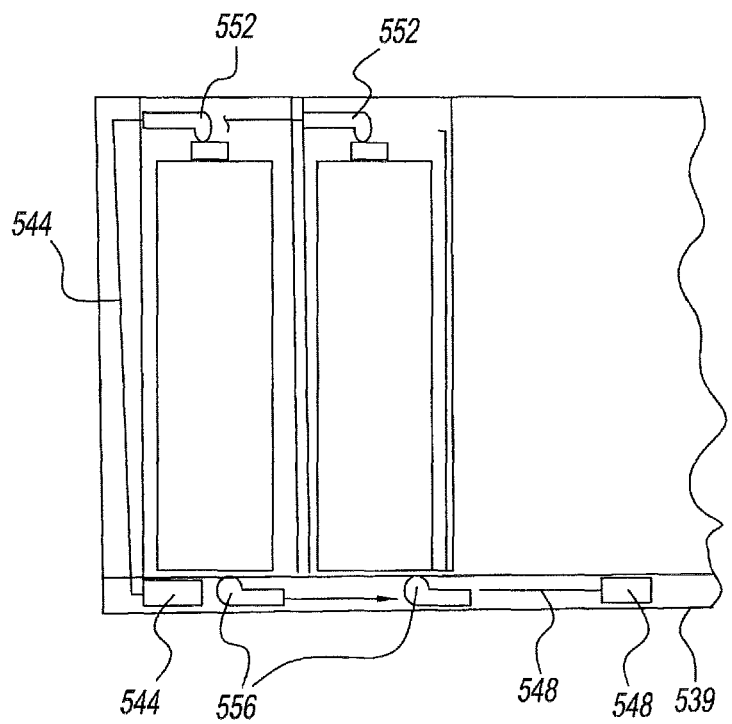
FIG. 14 is a fragmentary, schematic sectional view taken through plane 14-14 of FIG. 13.

FIGS. 13 and 14 illustrate another embodiment battery caddy 500 that is similar to the caddy of FIGS. 7-11 except the bottom wall 335 is replaced by an elongated bottom wall 536 that includes a central plate 539 having a charging coil 541 that is inductively interactive with an external inductive charging coil, not shown. The coil 541 is in electrical communication with charging electronics 540 which converts the induced charging current generated in the charging coil 541, and supplies DC charging current to a positive terminal bus 544 and a negative terminal bus 548. The coil 541, the electronics 540, the positive terminal bus 544 and the negative terminal bus 548 are all embedded into, or attached to, the plastic walls of the caddy. Each compartment includes a positive contact 552 that touches a positive terminal of a respective battery B and a negative contact 556 that touches a negative terminal of a respective battery B held therein. The positive contacts 552 are all electrically connected to the positive terminal bus 544 and the negative contacts 556 are all electrically connected to the negative terminal bus 548. The positive contact 552 can be incorporated into the detent 110 to allow for flexible outward movement for removal of the respective battery through the top opening 120. When the caddy 500 is placed on a charging pad with a charging inductive coil, the batteries held in the caddy can be charged. The electronics for inductive charging can be as described in US Published Application 2018/0097394, herein incorporated by reference.

The embodiment of FIGS. 13 and 14 can include the magnetic inserts 44 or 306 as previously described, or not. The embodiment of FIGS. 13 and 14 can alternately use a mechanical battery retaining system such as the detents 110 shown in FIG. 12 or any of the other retaining devices described in U.S. Pat. No. 9,022,218, herein incorporated by reference.

From the foregoing, it will be observed that numerous variations and modifications may be utilized without departing from the spirit and scope of the invention. It is to be understood that no limitation with respect to the specific apparatus illustrated herein is intended or should be inferred.

The invention claimed is:

1. A handheld battery holding and dispensing apparatus, comprising:
a frame including a plurality of compartments, each compartment sized and configured to hold a battery substantially within the compartment, and each compartment having a lower end and an opposite open end for dispensing the battery out of the compartment;
each compartment comprises a magnetic insert, located within the compartment or mounted to the compartment to retain the battery by magnetic force in the compartment; and
each compartment comprises a sidewall with a lower sidewall opening adjacent to the lower end and exposing a portion of a battery held therein that allows for a user to eject a battery at least partially out of the open end of the compartment by pushing the exposed portion of the battery with a finger moved longitudinally through the lower sidewall opening.

2. The handheld battery containing and dispensing apparatus according to claim 1, wherein each compartment includes a bottom wall and the magnetic inserts are fit into the bottom wall of each compartment.

3. The handheld battery containing and dispensing apparatus according to claim 1, wherein said compartments are arranged to contain batteries being oriented side-by-side in parallel.

4. The handheld battery containing and dispensing apparatus according to claim 1, wherein said frame is composed of a luminescent plastic.

5. The handheld battery containing and dispensing apparatus according to claim 1, wherein said compartments include an upper sidewall opening through the sidewall thereof, longitudinally spaced from the lower sidewall opening.

6. The handheld battery containing and dispensing apparatus according to claim 1, wherein said frame is elongated and sized to be held in a user's hand.

7. The handheld battery containing and dispensing apparatus according to claim 1, wherein said compartments are of varying sizes to accommodate a collection of standard batteries of various battery sizes.

8. The handheld battery containing and dispensing apparatus according to claim 1, wherein each said sidewall comprises an external rounded sidewall having a contour substantially parallel to an outside contour of a battery held therein.

9. The handheld battery containing and dispensing apparatus according to claim 8, wherein said external rounded sidewall includes an upper sidewall opening, wherein a user's finger can contact the standard battery within said compartment through said opening.

10. The handheld holding and dispensing apparatus according to claim 1, wherein each compartment comprises a bottom opening that is contiguous with the lower sidewall opening and allows for a user to eject a battery at least partially out of the open end of the compartment by pushing an exposed bottom edge of the battery longitudinally through the lower sidewall opening.

11. The handheld battery containing and dispensing apparatus according to claim 1, wherein the magnetic inserts are fit between sidewalls of adjacent compartments.

12. A handheld battery holding and dispensing apparatus, comprising:
a frame including a plurality of compartments, each compartment sized and configured to the shape and size of the outside perimeter of a standard battery selected from at least one of standard battery sizes AAA, AA, C, 9V, CR123 and 18650 in order to hold the standard battery within the compartment, and each compartment having a lower end and an opposite open end for dispensing the standard battery out of the compartment;

each compartment comprises a magnetic insert, located within the compartment, or mounted to the compartment, to retain the standard battery by magnetic force in the compartment; and each compartment comprises a sidewall with a lower sidewall opening adjacent to the lower end and exposing a portion of a battery held therein that allows for a user to eject a battery at least partially out of the open end of the compartment by pushing the exposed portion of the battery with a finger moved longitudinally through the lower sidewall opening.

13. The handheld battery containing and dispensing apparatus according to claim 12, wherein each compartment includes a bottom wall and the magnetic inserts are fit into the bottom wall of each compartment.

14. The handheld battery containing and dispensing apparatus according to claim 12, wherein said compartments are arranged to contain said standard batteries being oriented side-by-side in parallel.

15. The handheld battery containing and dispensing apparatus according to claim 12, wherein said frame is composed of a luminescent plastic.

16. The handheld battery containing and dispensing apparatus according to claim 12, wherein said compartments include an upper sidewall opening through a sidewall thereof, longitudinally spaced from the lower sidewall opening.

17. The handheld battery containing and dispensing apparatus according to claim 12, wherein said frame is elongated and sized to be held in a user's hand.

18. The handheld battery containing and dispensing apparatus according to claim 12, wherein said compartments are of varying sizes to accommodate a collection of standard batteries of various battery sizes.

19. The handheld battery containing and dispensing apparatus according to claim 12, wherein each said sidewall comprises an external rounded sidewall having a contour substantially parallel to an outside contour of the standard battery held therein.

20. The handheld holding and dispensing apparatus according to claim 12, wherein each compartment comprises a bottom opening that is contiguous with the lower sidewall opening and allows for a user to eject a battery at least partially out of the open end of the compartment by pushing an exposed bottom edge of the battery longitudinally through the lower sidewall opening.

21. The handheld battery containing and dispensing apparatus according to claim 12, wherein the magnetic inserts are fit between sidewalls of adjacent compartments.

\* \* \* \* \*